US012579868B2

(12) United States Patent
Eum et al.

(10) Patent No.: US 12,579,868 B2
(45) Date of Patent: Mar. 17, 2026

(54) PRINTER DETACHABLE KIOSK APPARATUS

(71) Applicant: HANASIS CO., LTD., Suwon-si (KR)

(72) Inventors: Jin Seop Eum, Hwaseong-si (KR); Moon Kyong Lee, Suwon-si (KR); Jung Yong Lee, Yongin-si (KR)

(73) Assignee: HANASIS CO., LTD., Suwon-si (KR)

( * ) Notice: Subject to any disclaimer, the term of this patent is extended or adjusted under 35 U.S.C. 154(b) by 35 days.

(21) Appl. No.: 18/756,793

(22) Filed: Jun. 27, 2024

(65) Prior Publication Data

US 2025/0104539 A1 Mar. 27, 2025

(30) Foreign Application Priority Data

Sep. 22, 2023 (KR) ........................ 10-2023-0126860

(51) Int. Cl.
*G07G 1/00* (2006.01)

(52) U.S. Cl.
CPC .................................. *G07G 1/0018* (2013.01)

(58) Field of Classification Search
None
See application file for complete search history.

(56) References Cited

U.S. PATENT DOCUMENTS 4,738,473 A * 4/1988 Meloni ................. A63F 3/0665 273/139
8,342,391 B2 * 1/2013 Morrison ................. G07B 1/00 235/375
9,600,026 B2 * 3/2017 Birgeoglu ................ G07G 3/00
11,836,773 B2 * 12/2023 Sawa ................. G06Q 30/0643
2001/0016138 A1 * 8/2001 Osmus ................... B41J 29/026 400/718
2002/0146271 A1 * 10/2002 Luciano, Jr. ............. B41J 29/12 400/693
2006/0039737 A1 * 2/2006 Takami .................. B41J 11/006 400/613

(Continued)

FOREIGN PATENT DOCUMENTS

KR 200346081 Y1 3/2004
KR 10-2011-0115352 A 10/2011

(Continued)

OTHER PUBLICATIONS

Copyright © 2022 · DustShield® Computer Enclosures · All Rights Reserved; Aug. 19, 2022; pp. 1-5 https://web.archive.org/web/20220816140239/https://www.dustshield.com/product-category/enclosures/printer-enclosures/ (Year: 2022).*

*Primary Examiner* — Fateh M Obaid
(74) *Attorney, Agent, or Firm* — Bridgeway IP Law Group, PLLC; Jihun Kim

(57) ABSTRACT

A kiosk apparatus capable of mounting or detaching a printer is described. In an embodiment, the printer is fixed by coupling with a stand unit, so the printer can be easily and stably mounted on the kiosk apparatus by simply inserting the printer into the housing. In addition, the embodiment allows the printer to be easily attached and detached from the kiosk apparatus by disconnecting the printer from the stand unit simply by opening operation of the door of the printer without using a separate tool. Therefore, for the maintenance of the printer, the manager can easily mount or detach the printer.

7 Claims, 10 Drawing Sheets

(56) References Cited

U.S. PATENT DOCUMENTS

| | | | | |
|---|---|---|---|---|
| 2006/0259195 | A1* | 11/2006 | Eliuk | B01F 33/8442<br>700/245 |
| 2007/0166093 | A1* | 7/2007 | Campanini | B41J 11/0075<br>400/693 |
| 2009/0195793 | A1* | 8/2009 | Silverbrook | G06F 1/1601<br>358/1.8 |
| 2010/0107908 | A1* | 5/2010 | Abe | B41J 2/17546<br>101/47 |
| 2010/0280657 | A1* | 11/2010 | Tyson | G07F 17/16<br>700/233 |
| 2011/0261394 | A1* | 10/2011 | Tanaka | G07G 5/00<br>248/346.03 |
| 2013/0088451 | A1* | 4/2013 | Payne | G06F 3/04845<br>345/173 |
| 2013/0107281 | A1* | 5/2013 | Maekawa | B41J 15/042<br>358/1.1 |
| 2013/0215275 | A1* | 8/2013 | Berini | G06V 10/993<br>348/150 |
| 2014/0071194 | A1* | 3/2014 | Inokuchi | B41J 13/0009<br>347/16 |
| 2014/0143077 | A1* | 5/2014 | Shah | G07F 11/10<br>705/16 |
| 2016/0071078 | A1* | 3/2016 | Corona | G06Q 20/18<br>705/16 |
| 2016/0176195 | A1* | 6/2016 | Kawate | B41J 2/17513<br>347/86 |
| 2016/0284019 | A1* | 9/2016 | Bowles | G06K 7/10861 |
| 2017/0100940 | A1* | 4/2017 | Ishizawa | B41J 2/17523 |
| 2017/0161704 | A1* | 6/2017 | Rimer | G06F 1/1632 |
| 2017/0255226 | A1* | 9/2017 | Birgeoglu | G06Q 20/18 |
| 2018/0244087 | A1* | 8/2018 | Celinder | B41J 29/02 |
| 2019/0126636 | A1* | 5/2019 | Hoshi | B41J 11/04 |
| 2019/0135000 | A1* | 5/2019 | Harris | B41J 15/042 |
| 2019/0236913 | A1* | 8/2019 | Susaki | G07G 1/0018 |
| 2019/0263161 | A1* | 8/2019 | Gotanda | G07G 1/0018 |
| 2020/0060407 | A1* | 2/2020 | Yasumoto | B41J 3/407 |
| 2020/0171812 | A1* | 6/2020 | Samuelson | G07F 19/205 |
| 2020/0171831 | A1* | 6/2020 | Lee | B41J 3/407 |
| 2020/0180330 | A1* | 6/2020 | Aizawa | G07G 5/00 |
| 2020/0180331 | A1* | 6/2020 | Aizawa | B41J 3/46 |
| 2021/0375104 | A1* | 12/2021 | Handshaw | G06Q 20/204 |
| 2022/0027879 | A1* | 1/2022 | Bowles | H04M 1/0287 |
| 2022/0163995 | A1* | 5/2022 | Rodriguez | H04W 4/02 |
| 2023/0001716 | A1* | 1/2023 | Wei Lee | G03G 5/00 |
| 2023/0294429 | A1* | 9/2023 | Dahlmann | B65H 31/02<br>271/8.1 |
| 2023/0321909 | A1* | 10/2023 | Sandoval | B33Y 10/00<br>425/174.4 |

FOREIGN PATENT DOCUMENTS

| | | | | |
|---|---|---|---|---|
| KR | 10-2013-0038463 A | | 4/2013 | |
| KR | 10-2013-0080571 A | | 7/2013 | |
| KR | 10-2022-0109038 A | | 8/2022 | |
| WO | WO-2008055258 A2 | * | 5/2008 | B41J 13/103 |

* cited by examiner

PRINTER DETACHABLE KIOSK APPARATUS

CROSS-REFERENCE TO RELATED APPLICATIONS

This application claims the priority of Korean Patent Application No. 10-2023-0126860 filed on Sep. 22, 2023, in the Korean Intellectual Property Office, the disclosure of which is incorporated herein by reference.

TECHNICAL FIELD

The present invention relates to a kiosk apparatus that can mount or detach a printer.

BACKGROUND ART

As the unmanned and non-face-to-face trend begins, kiosks are being introduced in various places, including public places. Kiosks have advantages such as improved customer convenience, reduced costs, and increased work efficiency, so demand for kiosks is continuously increasing in many fields.

Kiosks are composed of various devices to provide unmanned services. Among them, the printer is a key component of the kiosk. In general, kiosks input/output information through a display and provide various services to users. And as a result, various printed outputs (receipts, tickets, labels, and the like) are provided. These printed outputs are outputted through a printer mounted on the kiosk. Therefore, maintenance of the kiosk printer is essential for stable operation of the kiosk.

Kiosk managers often have to detach or mount printers from kiosks for maintenance. For example, there are cases where paper is supplied to the printer or the printer may break down. However, in existing kiosks, printers are coupled using screws, which causes the inconvenience of managers having to use separate tools each time to detach or attach the printer. In addition, there is a problem that the printer is not stably fixed to the kiosk during the detachment/installation process, so that failures frequently occur during use.

PRIOR ART LITERATURE

Patent Literature (Patent Literature 1) KR 10-2011-0115352 A, "Printer for Kiosk"

DETAILED DESCRIPTION OF THE INVENTION

Technical Subject

In order to solve the above problems, the printer detachable kiosk apparatus according to an embodiment of the present invention allows the manager to easily attach or detach the printer to the kiosk without using a separate tool, and ensures that the printer is stable even when installed.

Means for Solving the Problem

A printer detachable kiosk apparatus according to the present invention is a kiosk apparatus being coupled to a printer formed with a groove at a lower portion thereof, and comprises: a housing unit forming a mounting space into which the printer is inserted and mounted; and a stand unit including an engaging member being formed to protrude higher than the bottom surface of the housing unit so as to be engaged by the groove, and a fixing member being connected to the engaging member and coupled to the bottom surface, and characterized in that when the door of the printer is opened, a portion of the bottom surface being located at the front end of the engaging member supports one edge of the door, and the front end of the printer main body rises and tilts so that the groove is separated from the engaging member.

In a printer detachable kiosk apparatus according to the present invention, it is characterized in that the engaging member includes a first plane and a second plane each having a constant slope, and each of the slope of the first plane and the slope of the second plane is bent and connected so as to be different from each other, thereby forming a height difference between any two points spaced apart on the first plane and the second plane.

A printer detachable kiosk apparatus according to the present invention is characterized in that when the door comes into line contact with a portion of the bottom surface, the position of the front end of the printer main body rises while the door in line contact or a portion of the bottom surface acts as a fulcrum.

A printer detachable kiosk apparatus according to the present invention is characterized in that when the door comes into surface contact with a portion of the bottom surface, the position of the front end of the rising printer main body becomes the highest height.

A printer detachable kiosk apparatus according to the present invention is characterized in that in a state where the door is in surface contact with a portion of the bottom surface, the first height, which is the height lowered vertically from the rotation axis of the door to the outer edge of the door, is higher than the second height, which is the maximum height of the engaging member.

In a printer detachable kiosk apparatus according to the present invention, the stand unit is characterized in that the stand unit is disposed by inserting the engaging member into a penetrating surface formed in a partial area of a lower surface while the fixing member is coupled to a lower surface of the bottom surface.

A printer detachable kiosk apparatus according to the present invention includes a base unit that is surface-coupled to a lower portion of the bottom surface and having a portion of the area including the bottom surface coupled with the penetrating surface and the fixing member cut out.

A printer detachable kiosk apparatus according to the present invention is characterized in that in a state where the engaging member engaged a the groove, the printer fastening hole formed in a lower portion of the printer, the housing fastening hole formed by penetrating through the bottom surface of the housing, and the base fastening hole formed by penetrating through the base unit are positioned to correspond to one another, and the fastening hole is coupled to the printer fastening hole through the base fastening hole and the housing fastening hole.

Advantageous Effects

The printer detachable kiosk apparatus according to the embodiment of the present invention as described above has the following effects.

In the present invention, since the printer is fixed by coupling with the stand unit, the printer can be easily and stably mounted on the kiosk apparatus by simply inserting the printer into the mounting space of the housing.

In addition, the present invention allows the printer to be easily detached and attached from the kiosk apparatus by disconnecting the printer and the stand unit only by an opening operation of the door of the printer without using a separate tool, so that for the maintenance of the printer, the manager can easily mount or detach the printer on or from the kiosk apparatus.

In addition, the stand unit is exposed to the lower portion of the kiosk apparatus through a cut portion of the base, so the printer can be easily detached and attached from the kiosk apparatus by removing only the stand unit without disassembling or separating the housing unit.

In addition, the printer is coupled to the housing unit by a fastening hole that is coupled to the printer fastening hole through the housing fastening hole and the base fastening hole, thereby preventing theft of the printer being exposed in front of the housing unit; and during maintenance, the printer can be easily detached through the fastening hole exposed at the lower portion of the kiosk apparatus.

SPECIFIC DETAILS FOR IMPLEMENTING THE INVENTION

Hereinafter, with reference to the attached drawings, embodiments of the present invention will be described in detail so that those skilled in the art can easily implement the present invention. The present invention may be implemented in many different forms and is not limited to the structure or method described herein. Terms used in the description of the invention are for describing embodiments and are not intended to limit the invention. The term "comprising" in the description of the invention is intended to designate the existence of a configuration combining the described features. Therefore, it should be understood that it does not exclude the possibility of the presence or addition of one or more other features or a combined configuration thereof. Hereinafter, detailed descriptions of the disclosed configurations and functions will be omitted as they are obvious to those skilled in the art.

Figure 1:
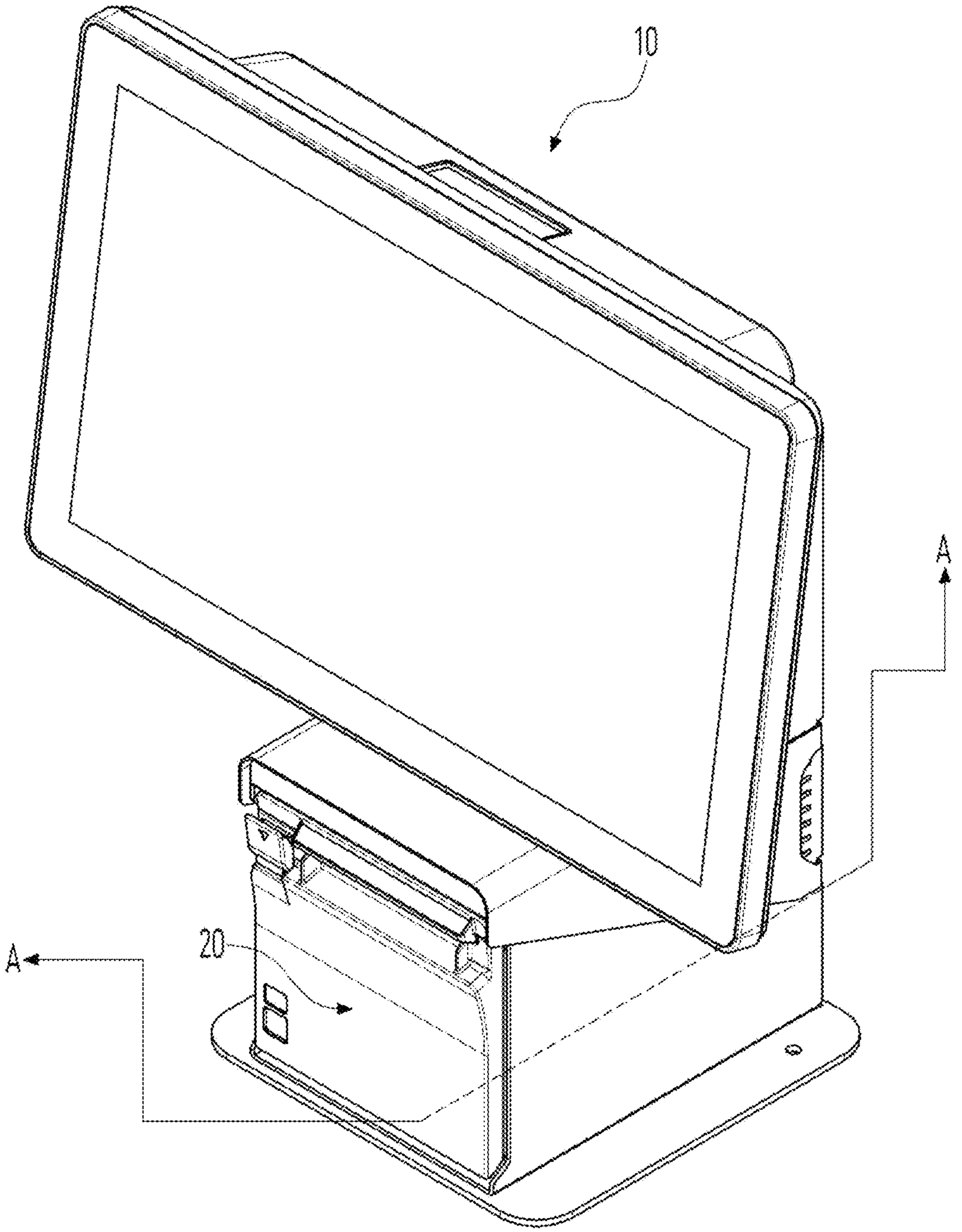
FIG. 1 is a diagram showing a printer detachable kiosk apparatus according to an embodiment of the present invention.

FIG. 1 is a diagram showing a printer detachable kiosk apparatus 10 according to an embodiment of the present invention. FIG. 1 shows a state in which a printer 20 is mounted on a printer detachable kiosk apparatus 10. The printer detachable kiosk apparatus 10 according to an embodiment of the present invention can detach or mount the printer 20. The printer 20 is connected to a control unit of the kiosk apparatus 10 and can output various outputs as a result of services provided by the kiosk apparatus 10. The printer 20 is mounted to be disposed at a lower portion of the display unit of the kiosk apparatus 10. According to the present invention, in the process of detaching or mounting the printer 20 from or onto the kiosk apparatus 10, the manager can easily detach and mount the printer 20 from and onto the kiosk apparatus 10 only by an opening operation of the door 23 of the printer 20 without using a separate tool.

Figure 2:
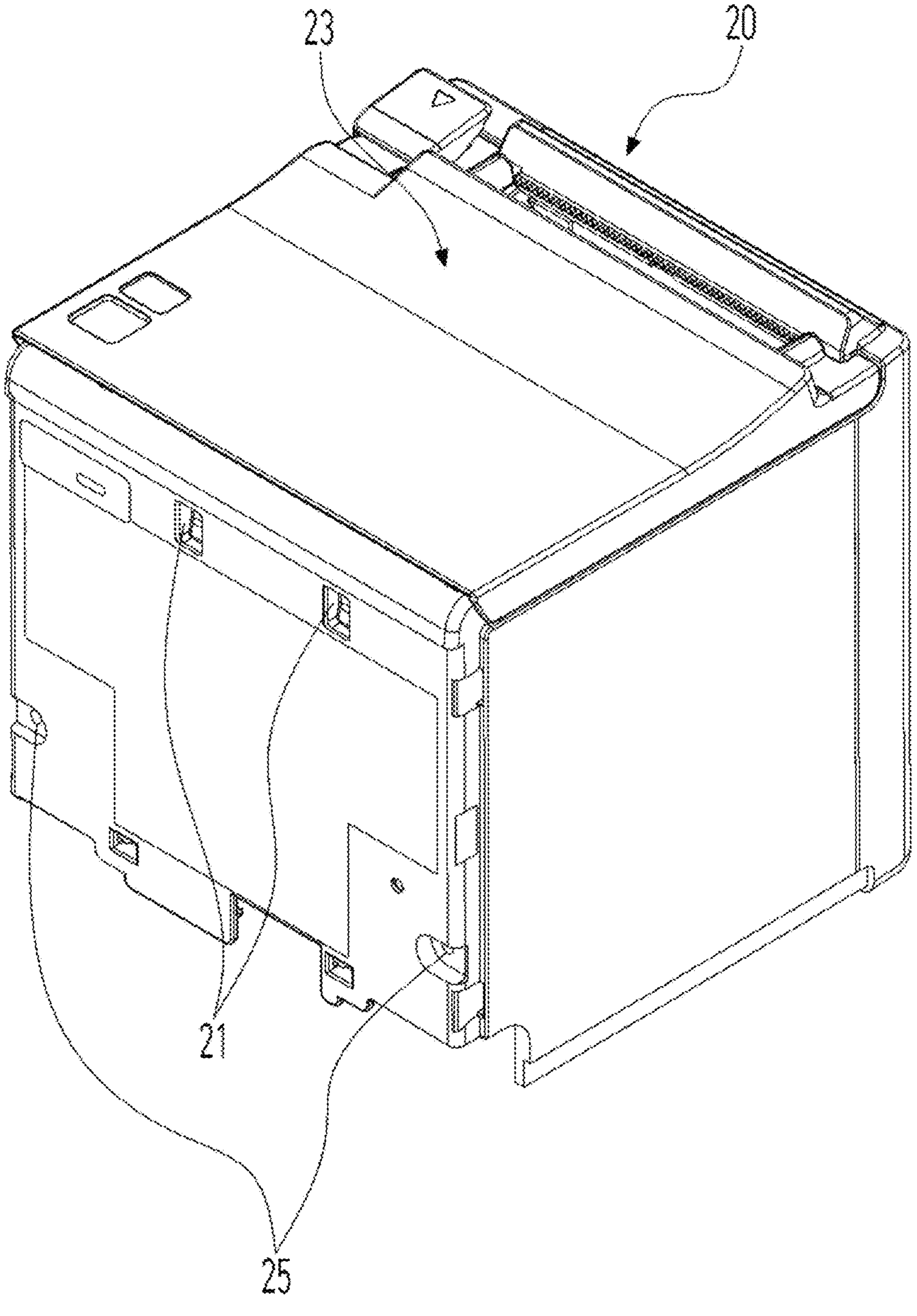
FIG. 2 is a diagram showing a printer being mounted on or detached from a printer detachable kiosk apparatus according to an embodiment of the present invention.

FIG. 2 is a diagram showing the printer 20 mounted on or detached from the printer detachable kiosk apparatus 10 according to an embodiment of the present invention. Referring to FIG. 2, the printer 20 includes a door 23 being opened and closed in the front thereof. This door 23 can be opened by manipulating the control unit provided in the printer 20. The door 23 is hinge-coupled to the main body of the printer 20 and can be opened or closed with respect to the rotation axis of the lower portion. In the example of FIG. 2, when the button being protruded at an upper left corner is pulled, the door 23 of the printer 20 is opened. However, as for opening the door 23, the control unit can be implemented in various structures.

A groove 21 of a certain depth is formed in a lower portion of the printer 20. The groove 21 is disposed at the front end of the lower portion of the printer 20. Depending on the embodiment, the groove 21 may be disposed adjacent to the door 23 in state where the door 23 is fully opened. In the kiosk apparatus 10 of the present invention, the printer 20 is detached by an opening operation of the door 23, and when the groove 21 is disposed adjacent to the door 23, the printer 20 can be more easily disconnected from the stand unit 200, which will be described later. In the example of FIG. 2, two grooves 21 are formed spaced apart from each other in the lower portion of the printer 20, but the number of grooves 21 can be increased or decreased. Depending on the embodiment, when the number of grooves 21 decreases, the area of the groove 21 may increase, and when the number of grooves 21 increases, the area of the groove 21 may decrease.

Additionally, a printer fastening hole 25 is formed in a lower portion of the printer 20. The fastening hole is coupled to the printer fastening hole 25. The fastening hole secures the printer 20 to the kiosk apparatus 10. More specifically, the fastening hole secures the printer 20 to a housing unit 100, which will be described later. Therefore, unless the fastening hole is removed, the printer 20 is not separated from the kiosk apparatus 10. This is to prevent the problem of the printer 20 being stolen in a state where the front of the printer 20 mounted on the kiosk apparatus 10 is exposed. In the example of FIG. 2, two printer fastening holes 25 are formed spaced apart from each other in a lower portion of the printer 20, but the number of printer fastening holes 25 may be increased or decreased. Depending on an embodiment, the fastening hole may be a thread or screw, and a thread may be formed in the printer fastening hole 25 to be screw-coupled. However, the fastening hole is not limited to threads or screws, and may include various fixing methods as long as the printer 20 can be fixed to the kiosk apparatus 10.

Figure 3:
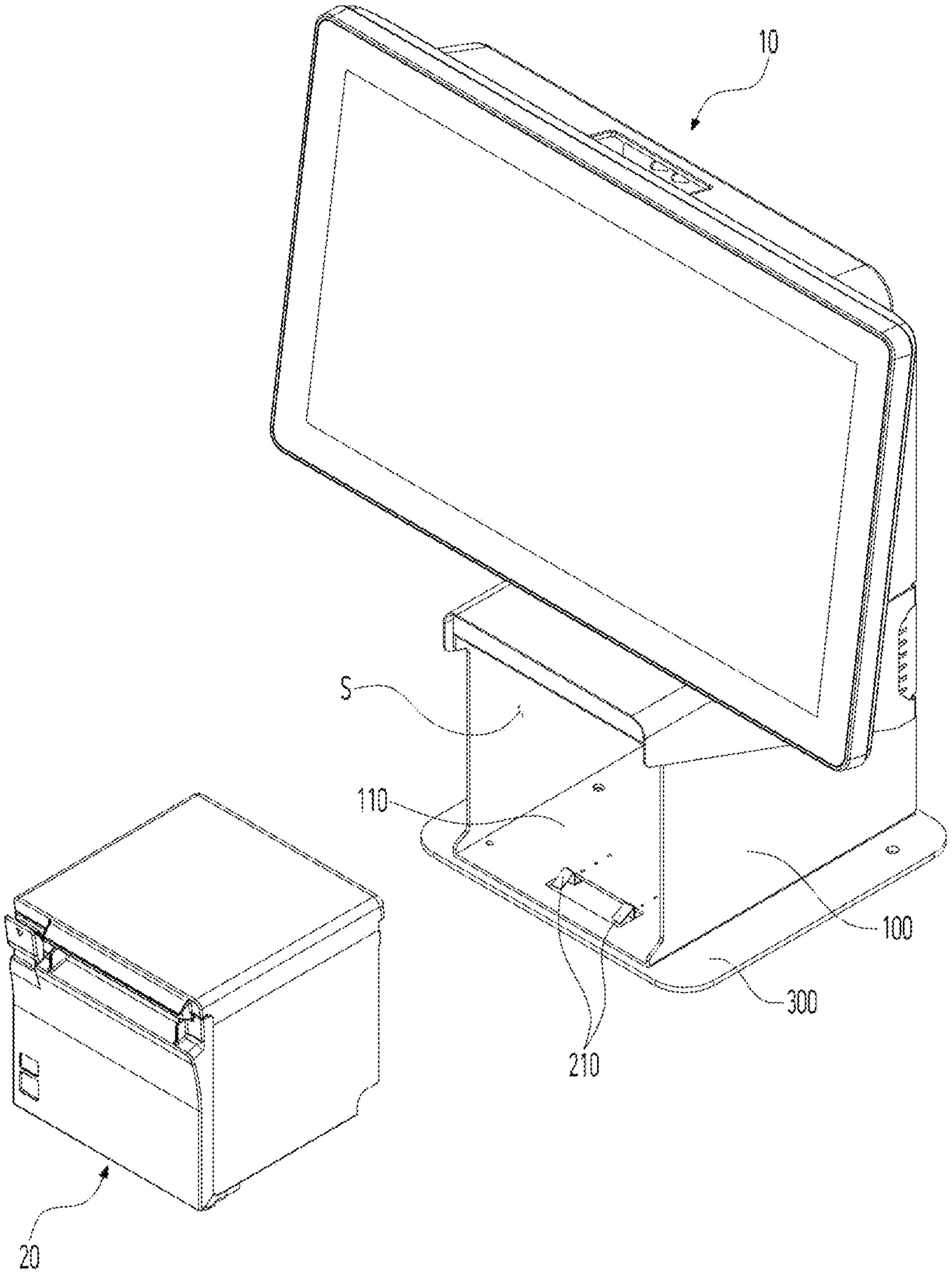
FIG. 3 is a diagram showing a printer detachable kiosk apparatus and a printer in a state detached from according to an embodiment of the present invention.
Figure 4:
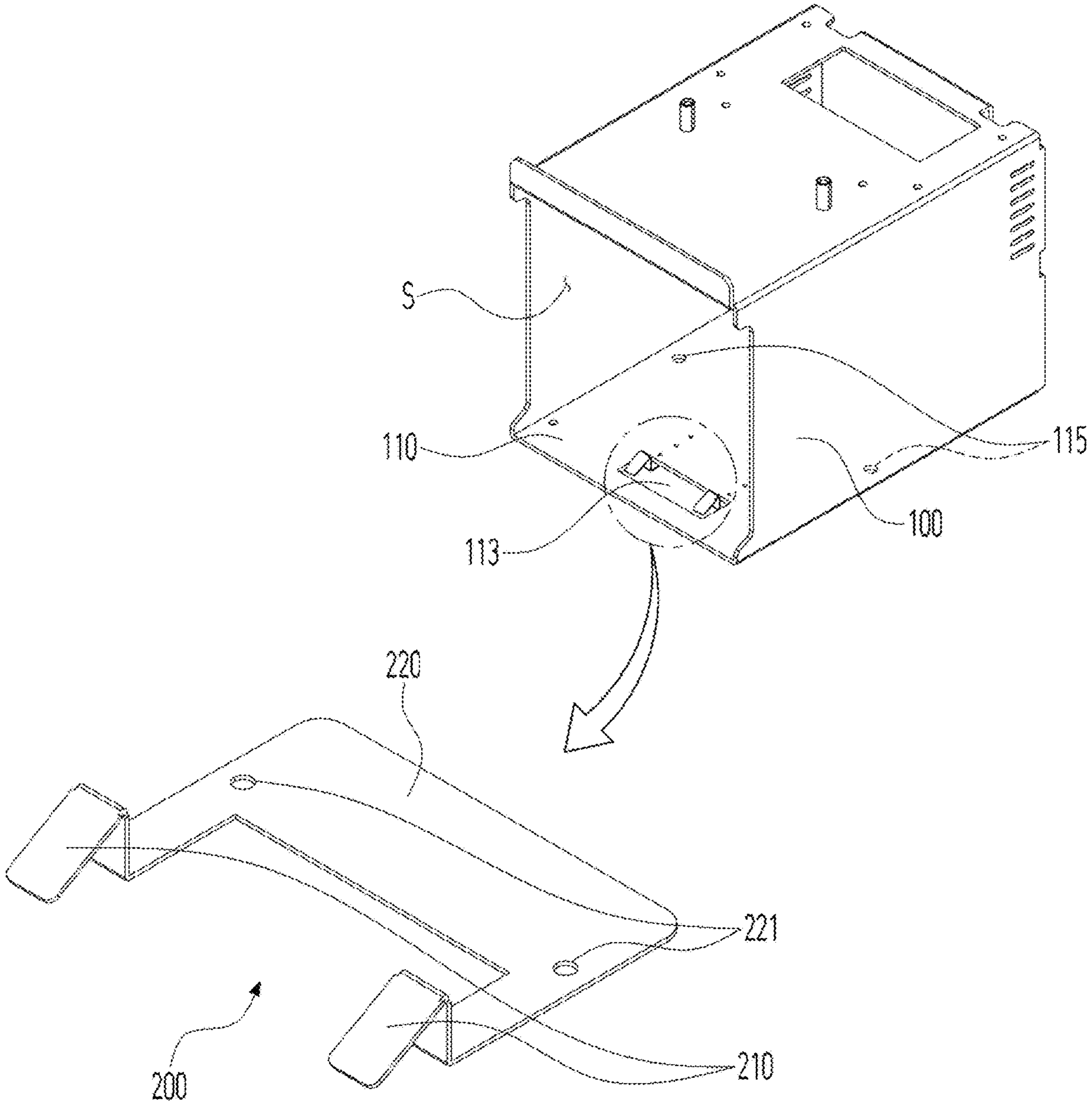
FIG. 4 is a diagram showing a housing unit and a stand unit of a printer detachable kiosk apparatus according to an embodiment of the present invention.
Figure 5:
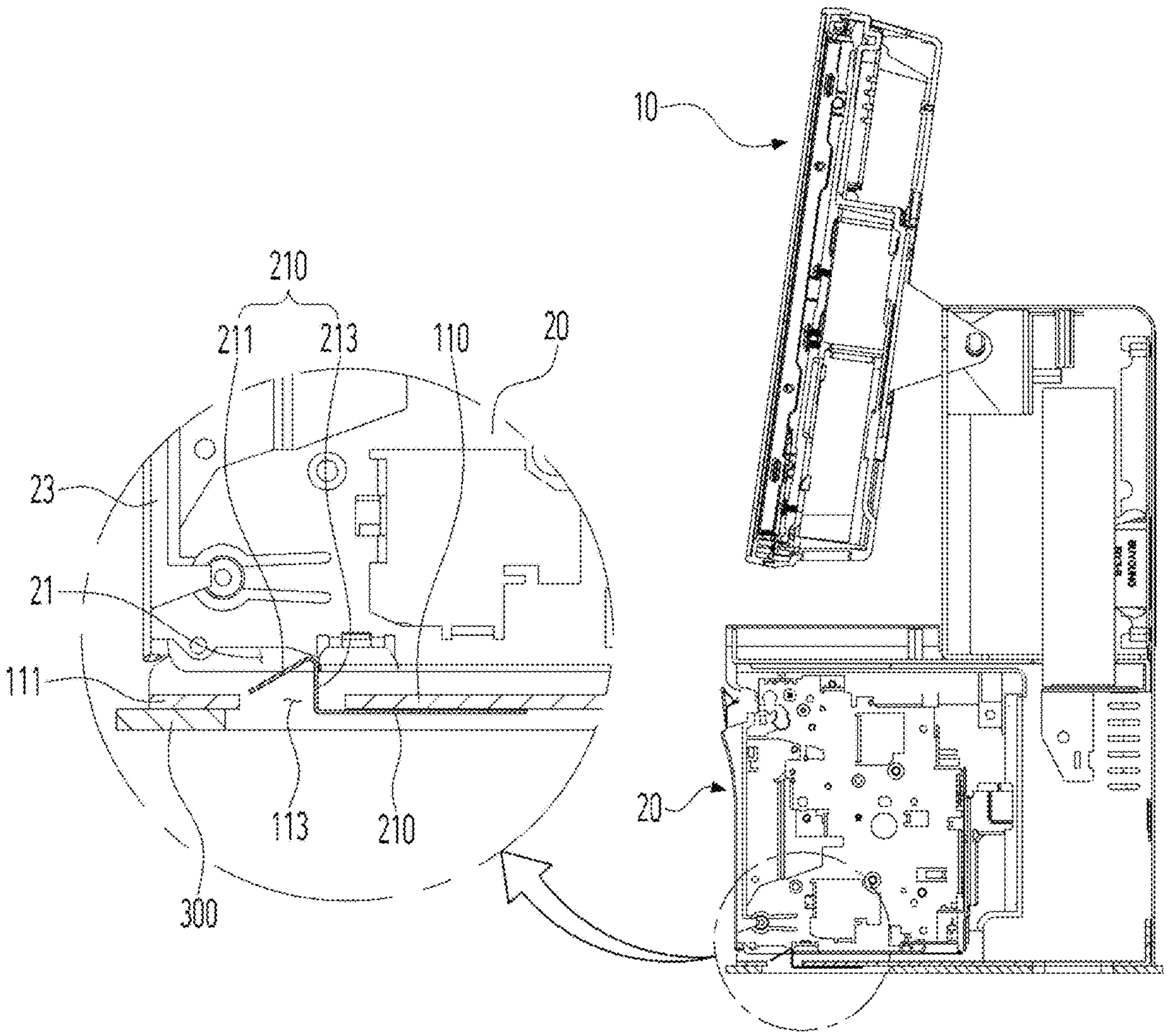
FIG. 5 is a diagram showing a cross-section A-A in a state when a printer is mounted on a printer detachable kiosk apparatus according to an embodiment of the present invention.
Figure 6:
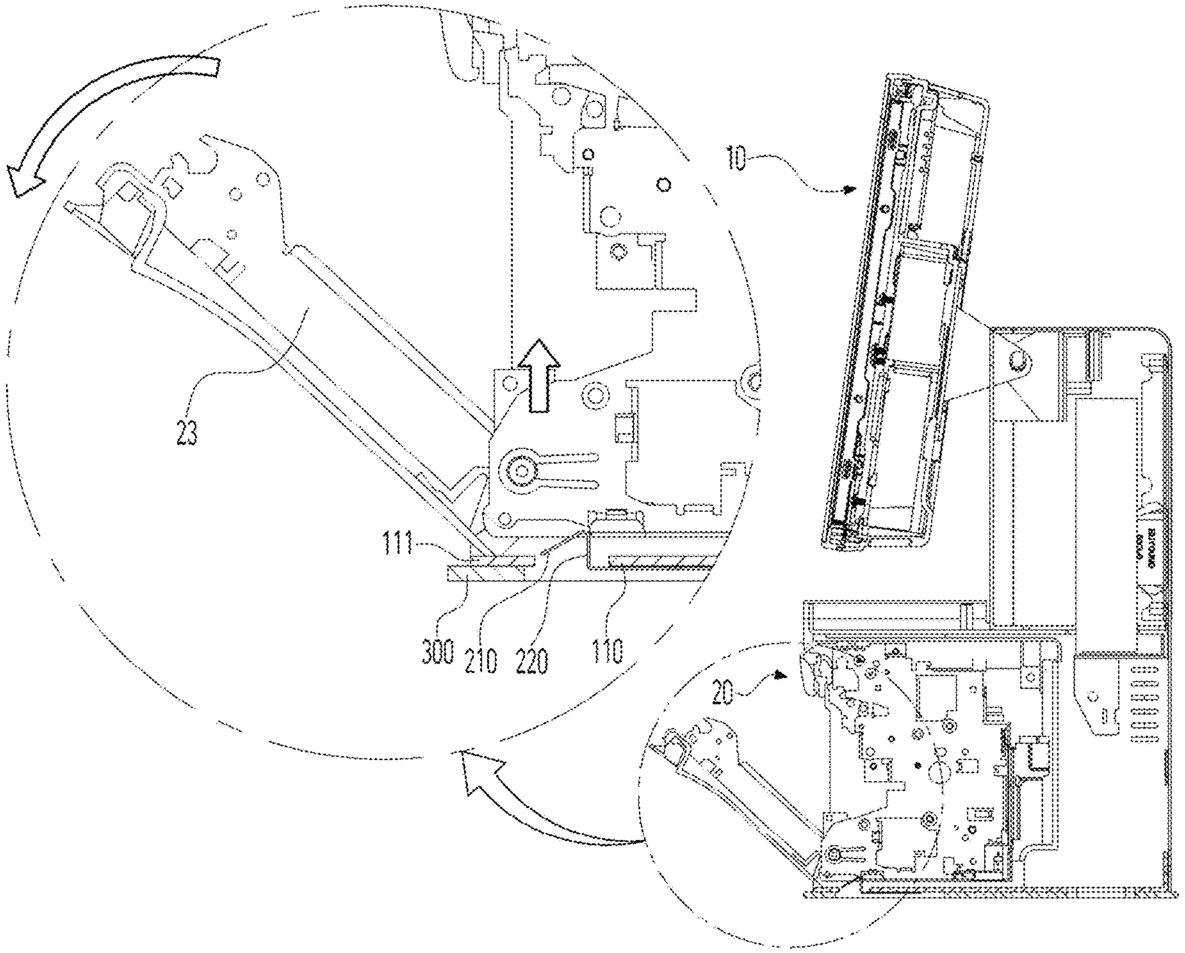
FIG. 6 is a diagram showing a cross-section A-A in a state where a printer is mounted on a printer detachable kiosk apparatus according to an embodiment of the present invention and the door is open.
Figure 7:
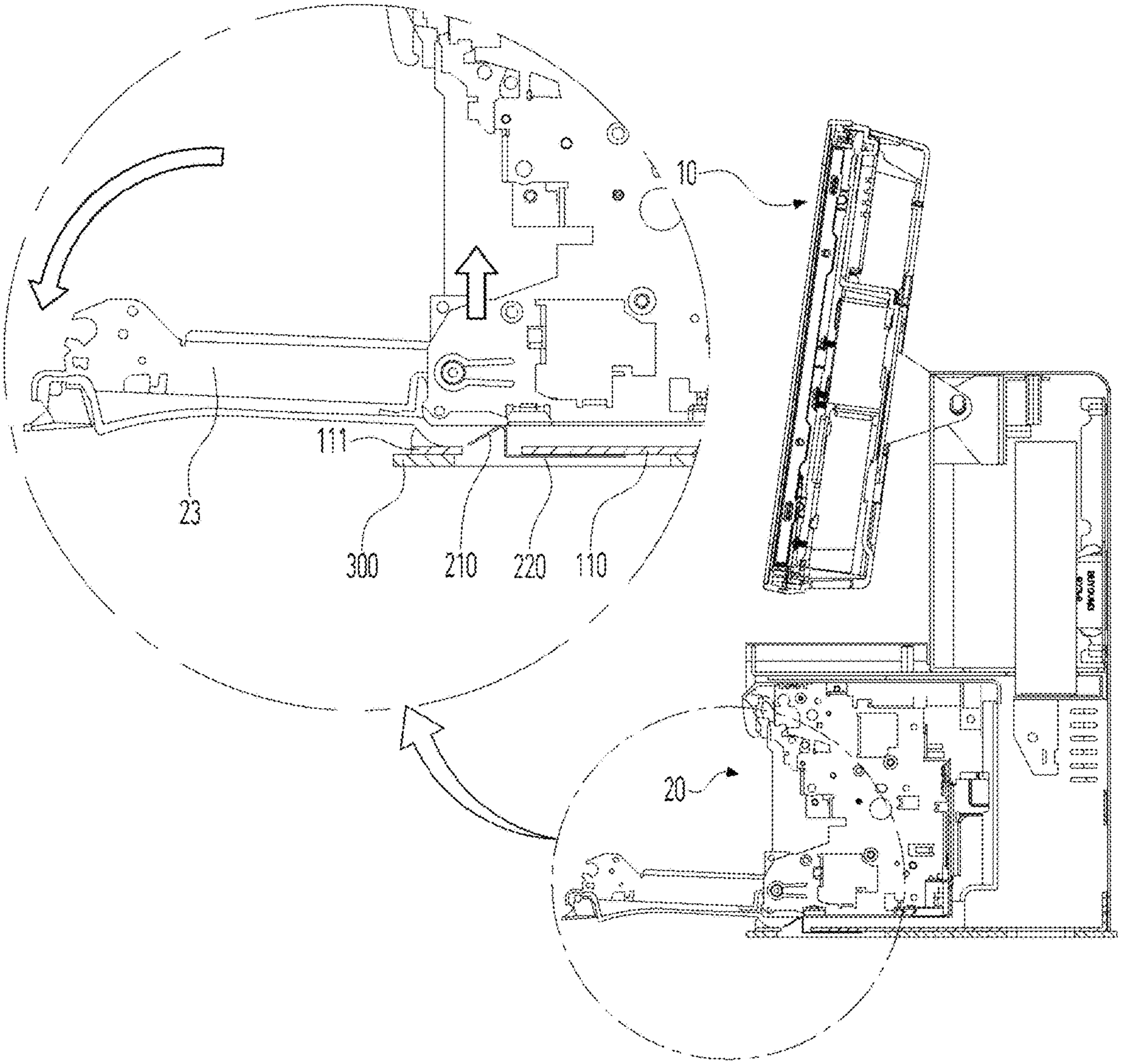
FIG. 7 is a diagram showing a cross section A-A in a state where a printer is mounted on a printer detachable kiosk apparatus according to an embodiment of the present invention and the door is open.
Figure 8:
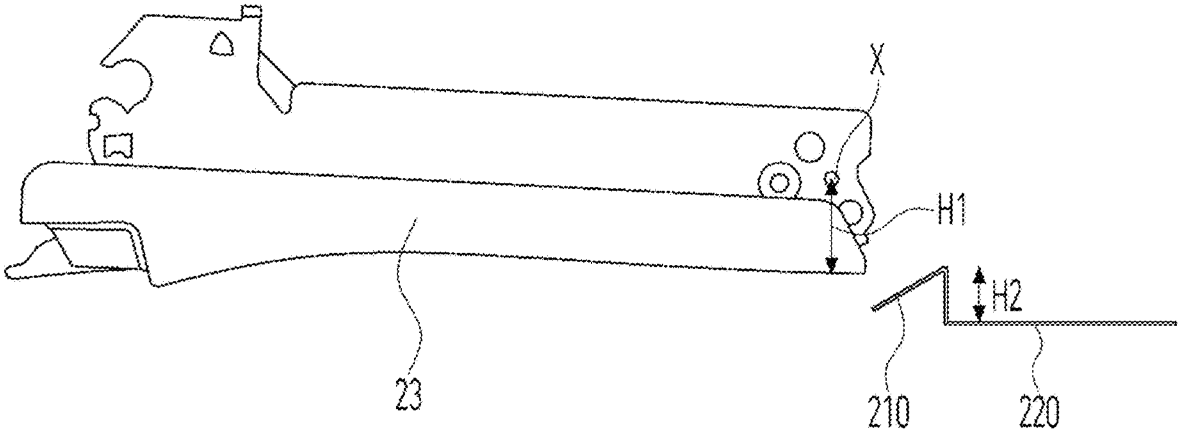
FIG. 8 is a diagram showing a printer door and a stand unit in a printer detachable kiosk apparatus according to an embodiment of the present invention.
Figure 9:
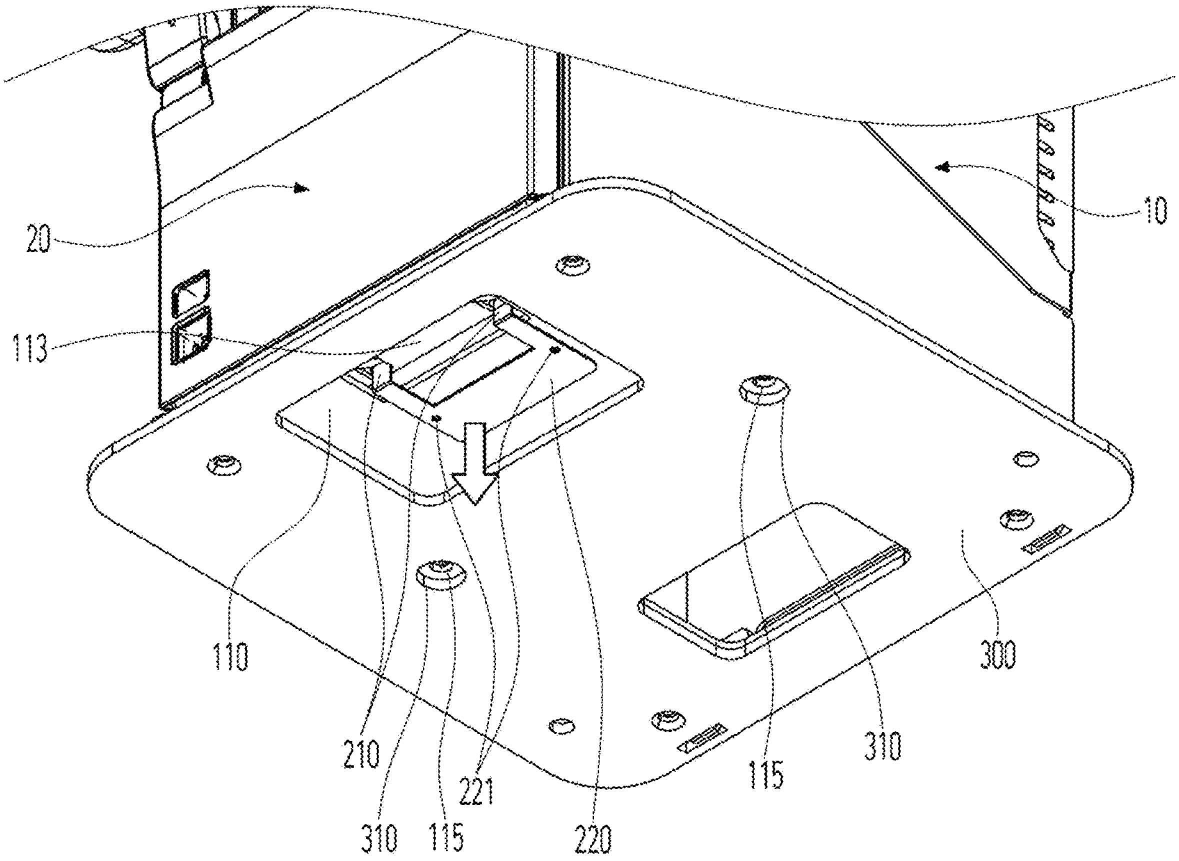
FIG. 9 is a diagram showing the lower portion of the printer detachable kiosk apparatus according to an embodiment of the present invention.
Figure 10:
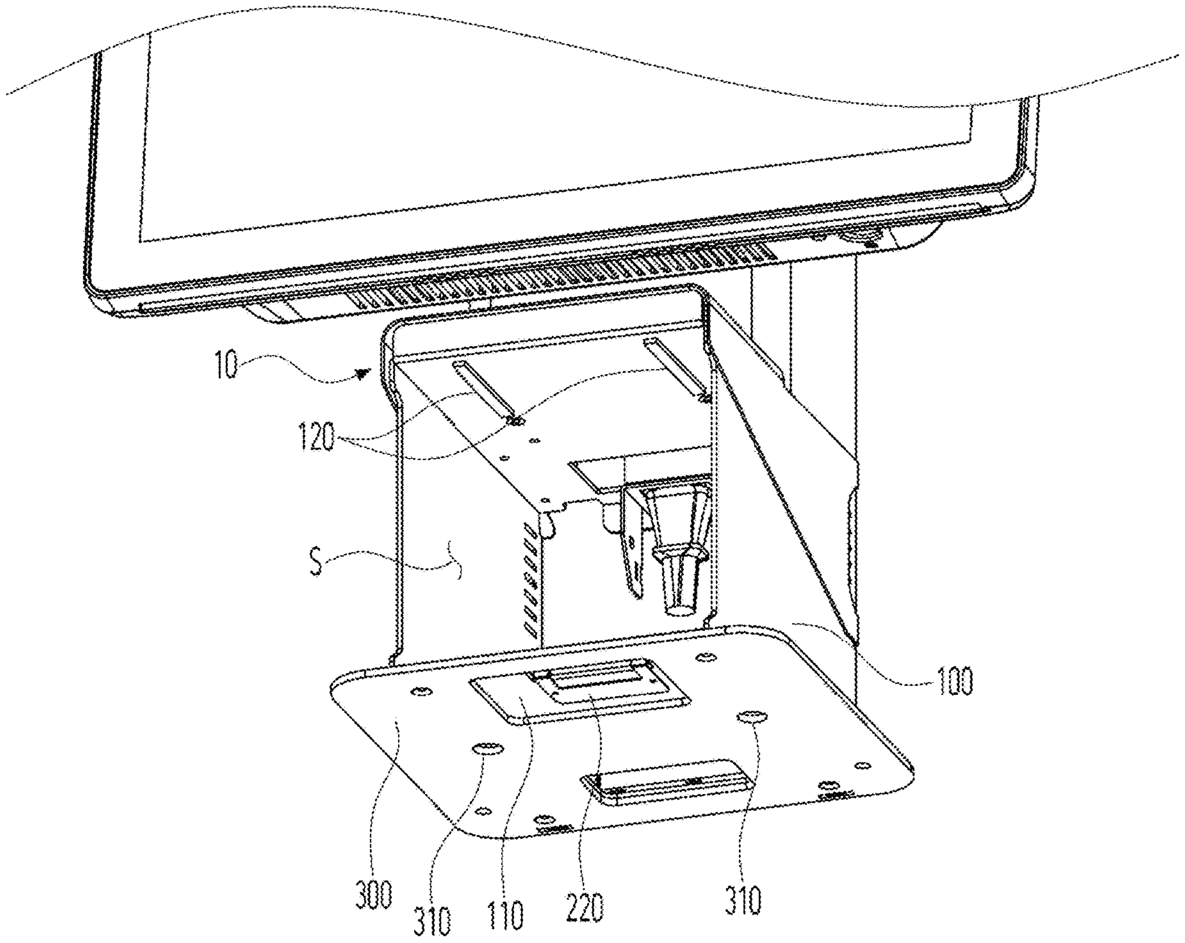
FIG. 10 is a diagram showing a pad of a printer detachable kiosk apparatus according to an embodiment of the present invention.

FIG. 3 is a diagram showing a printer detachable kiosk apparatus and a printer 20 in a state detached from according to an embodiment of the present invention. FIG. 4 is a diagram showing a housing unit 100 and a stand unit 200 of a printer detachable kiosk apparatus 10 according to an embodiment of the present invention. FIG. 5 is a diagram showing a cross-section A-A in a state where a printer 20 is mounted on a printer detachable kiosk apparatus 10 according to an embodiment of the present invention. FIGS. 6 and 7 are diagrams showing a cross-section taken along line A-A in a state where the printer 20 is mounted on the printer detachable kiosk apparatus 10 according to an embodiment of the present invention and the door 23 is opened. FIG. 8 is a diagram showing a door 23 and a stand unit 200 in a printer detachable kiosk apparatus 10 according to an embodiment of the present invention. FIG. 9 is a diagram showing the lower portion of the printer detachable kiosk apparatus 10 according to an embodiment of the present invention. FIG. 10 is a diagram showing a pad 120 of a printer detachable kiosk apparatus 10 according to an embodiment of the present invention.

Referring to FIGS. 3 to 10, a printer detachable kiosk apparatus 10 according to an embodiment of the present invention may comprise: a housing unit 100 that provides a space for mounting the printer 20; a stand unit 200 being coupled with the printer 20 to mount or detach the printer 20 on or from the housing unit 100; and a base unit 300 being disposed on a bottom surface of the housing unit 100 and supporting the kiosk apparatus 10 to be installed stably.

The housing unit 100 is disposed at a lower portion of the display unit including a display panel and forms a portion among the overall frame of the kiosk apparatus 10. Inside the housing unit 100, a printer 20 and a control unit are disposed, and an internal space where cables can be connected to various devices is formed. Such a housing unit 100 serves to protect the printer 20 and the control unit from the external environment. The upper portion of the housing unit 100 is extended up to the rear of the display unit, and the display unit can be rotatably coupled to the housing unit 100. Depending on the embodiment, the display unit and the housing unit 100 may be connected to each other in a state in which the internal space communicates.

The housing unit 100 forms a mounting space S inside which the printer 20 is inserted and mounted. The printer 20 is inserted into the mounting space S through an open space in the front of the housing unit 100 and mounted on the kiosk apparatus 10. The mounting space S is formed in a lower portion of the display unit, and the printer 20 is inserted into the mounting space S, so the printer 20 is disposed in a lower portion of the display unit in the kiosk apparatus 10. Therefore, after operating the kiosk through the display unit, the user can immediately check the output of the printer 20 without changing the location.

The housing unit 100 includes a bottom surface 110 forming the bottom of the mounting space S and a pad 120 being disposed on the ceiling surface forming the ceiling of the mounting space S. The bottom surface 110 is connected to the side wall configuring the housing unit 100 and forms a mounting space S whose front is open. The bottom surface 110 provides a space where the printer 20 is located when the printer 20 is inserted and mounted on the mounting space S. The bottom surface 110 includes a support area 111 that supports the door 23 of the printer 20 in a state where the door 23 is opened. The support area 111 is a part of area of the bottom surface 110 and is located at the front end of the bottom surface 110. The support area 111 is located in front of the penetrating surface 113 formed on the bottom surface 110 and is an area formed in the shape of a long rectangular bar. The penetrating surface 113 is formed as a portion of the bottom surface 110 is penetrated. An engaging member 210, which will be described later, is inserted and disposed on the penetration surface 113. The housing fastening hole 115 is formed in a location corresponding to the printer fastening hole 25, in a state where the printer 20 is inserted and mounted on the mounting space S of the housing unit 100. That is, the printer fastening hole 25 and the housing fastening hole 115 are positioned to correspond to each other. In the example of FIG. 4, two housing fastening holes 115 are formed spaced apart from each other, but depending on the embodiment, they may be formed corresponding to the number of printer fastening holes 25. The fastening hole is coupled to the printer fastening hole 25 through the housing fastening hole 115. The printer 20 is fixed to the mounting space S of the housing unit 100 by the fastening hole. Therefore, even if the printer 20 is partially exposed in the front of the housing unit 100, the printer 20 cannot be separated unless the fastening hole is removed.

Referring to FIG. 10, the pad 120 is formed in the shape of a long rectangular bar. As the pad 120 is in contact with an upper surface of the printer 20, damages that may occur when the printer 20 collides with the ceiling surface of the housing unit 100 during the detachment and mounting processes are prevented. In addition, the pad 120 can effectively prevent clearance by supplementing the empty gap between the printer 20 and the mounting space S when detaching and mounting the printer 20. Depending on the embodiment, a plurality of pads 120 may be spaced apart from one another and disposed on the ceiling in a direction in which the printer 20 is inserted. When the pad 120 is disposed in a direction in which the printer 20 is inserted, the gap between the printer 20 and the mounting space S can be effectively complemented without interfering with the operation of the printer 20 being inserted into or removed from the mounting space S. At this time, the maximum height of the pad 120 is limited so as not to prevent the front end of the main body of the printer 20 from rising to a second height H2. If the front end of the main body of the printer 20 cannot rise to the second height H2 due to the pad 120, the groove 21 is not completely separated from the engagement member 210, so that the printer 20 may not be easily detached.

The stand unit 200 is configured to allow the printer 20 to be mounted on or detached from the housing unit 100 of the kiosk apparatus 10. Specifically, the stand unit 200 is coupled to or disengaged from the printer 20, and is mounted on or detached from the housing unit 100. The stand unit 200 can be coupled with the housing unit 100 through a fastening hole. Therefore, by removing the fastening hole, the housing unit 100 can be easily separated from the stand unit 200.

The stand unit 200 includes: an engaging member 210 being engaged in a groove 21 at a lower portion of the printer 20; and a fixing member 220 being coupled to the housing unit 100. The engaging member 210 is coupled to the groove 21 and formed to be protruded higher than the fixing member 220 in order to be easily engaged in the groove 21. Therefore, in a state where the stand unit 200 is coupled to the housing unit 100, it is formed to be protruded higher than the bottom surface 110 of the housing unit 100. The maximum protrusion height of the engaging member 210 may be the height of the depth of the groove 21 plus the thickness of the bottom surface 110. The engaging member 210 includes a first plane 211 and a second plane 213 having a flat area. The first plane 211 forms a surface on which the lower surface of the printer 20 rises when the printer 20 is mounted. Referring to FIGS. 4 and 5, the first plane 211 is formed to be symmetrical left and right and spaced apart, and is formed to face the lower portion of the printer 20 when the printer 20 is mounted. When the printer 20 is inserted into the mounting space S, the left side and right side of the lower portion of the printer 20 are supported by the first plane 211, respectively, and can stably climb on the first plane 211 without tilting. The second plane 213 is connected to the first plane 211 and formed to be protruded so as to be engaged in the groove 21 at a lower portion of the printer 20. Accordingly, as the printer 20 rides up the first plane 211, the groove 21 is engaged in the second plane 213 to be fixed thereto. Depending on the embodiment, the first planes 211 spaced apart are connected as one, and the second planes 213 may also be connected and formed as one.

The slope of the first plane 211 and the slope of the second plane 213 are bent and connected so as to be different from each other. Accordingly, a height difference is formed between any two points spaced apart on the first plane 211 and the second plane 213. Depending on the embodiment, the height difference between any two points spaced apart at equal intervals may be greater on the second plane 213 than on the first plane 211. That is, the absolute value of the slope of the second plane 213 is larger.

The fixing member 220 is a configuration that fixes the stand unit 200 in a state being coupled to the housing unit 100. The fixing member 220 is formed in the shape of a flat plate. The fixing member 220 is connected to one side to the engaging member 210 and is coupled to the bottom surface 110 of the housing unit 100 to fix the stand unit 200. The fixing member 220 can stably fix the stand unit 200 as the plane of the plate is surface-coupled with the bottom surface 110. A coupling hole 221 is formed in the fixing member 220. The stand unit 200 can be coupled to the housing unit 100 through a fastening hole coupled to the coupling hole 221.

When the printer 20 is inserted into the mounting space S, the engaging member 210 is engaged in the groove 21 at a lower portion of the printer 20 so as to couple the printer 20 and the stand unit 200. Referring to FIG. 5, as the printer 20 is inserted into the mounting space S, the first plane 211 is first in contact with the lower portion of the printer 20. The first plane 211 has a gentler slope than the second plane 213 and a slope is formed therein. Accordingly, the lower portion of the printer 20 moves along the slope of the first plane 211, and the printer 20 can be smoothly inserted into the mounting space S. As the first plane 211 is partially elastically deformed while supporting the printer 20 being inserted into the mounting space S, the slope of the first plane 211 may be temporarily changed. Due to this change in the slope, the printer 20 can move more smoothly riding on the first plane 211.

The second plane 213 has a greater slope than the first plane 211 and is formed to be protruded close to perpendicular to the fixing member 220 or the bottom surface 110. The inner side surface of the groove 21 at a lower portion of the printer 20 is in contact with the second plane 213 so as to be coupled thereto. Since the second plane 213 has a greater slope than the first plane 211, the second plane 213 functions as a jaw being caught by the groove 21. Therefore, when the engaging member 210 is coupled to the groove 21, the movement of the printer 20 within the mounting space S is restricted, thereby stably fixing the printer 20 to the housing unit 100. The difference in the slopes of the first plane 211 and the second plane 213 and the configuration in which they are connected by being bent has an effect of ensuring a smooth connection in that each of the operations of inserting the printer 20 into the mounting space S and coupling it with the stand unit 200 is not separated. the printer 20 While the first plane 211 supports the printer 20 being inserted into the mounting space S, the second plane 213 is also partially elastically deformed, and the slope of the second plane 213 may temporarily be changed. The change in the slope of the second plane 213 allows the slope of the first plane 211 to be changed more flexibly.

Referring to FIGS. 4 and 9, the stand unit 200 is disposed when the engaging member 210 is inserted in the penetrating surface 113 formed in a portion of the area of the bottom surface 110 as the fixing member 220 is coupled to a lower surface of the bottom surface 110. In other words, the engaging member 210 passes through the penetrating surface 113 and is disposed within the mounting space S in a state of being protruded.

Referring to FIGS. 3 and 9, the base unit 300 is surface-coupled to a lower portion of the bottom surface 110, and a portion of the area including the penetrating surface 113 and the bottom surface 110 coupled with the fixing member 220 is cut. That is, the penetrating surface 113 and the fixing member 220 are exposed to the outside through the cut area of the base unit 300. The fixing member 220 is coupled to a lower surface of the bottom surface 110 by a fastening hole, and the coupling hole 221 to which the fastening hole is coupled is also exposed to the outside through the cut area. In a state where the printer 20 is inserted and mounted in the mounting space S, problems may occur during the detachment and mounting process due to various reasons. According to the present invention, since the penetrating surface 113, the fixing member 220, and the coupling hole 221 are all exposed, the exposed components can be removed through the cut area and easily disconnected from the stand unit 200 without disassembling or separating the housing unit 100. When the stand unit 200 is removed, the structure for fixing the printer 20 is removed, so the printer 20 can be easily detached from the mounting space S. According to the present invention, the printer 20 can be easily detached and mounted in various situations, which has the effect of making maintenance of the printer 20 easier.

A base fastening hole 310 is formed through the base unit 300. The base fastening hole 310 is formed at a position corresponding to the printer fastening hole 25 and the housing fastening hole 115 in a state where the printer 20 is inserted and mounted in the mounting space S of the housing unit 100. That is, the printer fastening hole 25, the housing fastening hole 115, and the base fastening hole 310 are positioned to correspond to each other. Depending on the embodiment, the number of base fastening holes 310 may be formed to correspond to the number of printer fastening holes 25. The fastening hole is coupled to the printer fastening hole 25 through the base fastening hole 310 and the housing fastening hole 115. The printer 20 is fixed to the mounting space S of the housing unit 100 by the fastening hole. Therefore, even if the printer 20 is partially exposed to the front of the housing unit 100, the printer 20 cannot be separated unless the fastening hole is removed. The base fastening hole 310 is formed by penetrating so that the printer fastening hole 25 and the housing fastening hole 115 are exposed to the outside of the base unit 300, and is formed to have a larger diameter than the housing fastening hole 115. This difference in diameter is intended to more easily remove the fastening hole from the printer fastening hole 25 even if there is a slight difference in position between the fastening holes. The fastening hole and each of the fastening holes 25, 115, and 310 prevent the theft of the printer 20 in normal times by penetrating and coupling the fastening hole, and during maintenance, the printer 20 can be easily detached and mounted by easily removing it through the fastening holes 25, 115, and 310 exposed to the outside.

In a state where the printer 20 is inserted and mounted in the mounting space S, the printer 20 must be detached for the maintenance of the printer 20. The housing unit 100 of the kiosk apparatus 10 is limited in size to accommodate only the printer 20 in order to stably fix the printer 20. Accordingly, there is no free space in the mounting space S, making it difficult to detach and mount the printer 20. However, according to the present invention, the printer 20 can be detached by an opening operation of the door 23 of the printer 20 by releasing the engagement between the grooves 21 and the engaging member 210. FIG. 6 shows a state in which the door 23 is partially open, and FIG. 7 shows a state in which the door 23 is fully open. In FIG. 6, when the door 23 of the printer 20 is opened, the support area 111 located at the front of the engaging member 210 supports one edge of the door 23. As the support area 111 supports one edge of the door 23, the front end of the main body of the printer 20 rises and tilts, and the groove 21 is separated from the engaging member 210.

Referring to FIG. 6, the edge of the door 23 and the support surface come into line contact with each other as the door 23 is opened. When the door 23 makes line contact with the support area 111 of the bottom surface 110, the support area 111 of the door 23 or the bottom surface 110 being in line contact serves as a fulcrum. The position of the front end of the main body of the printer 20 rises. That is, based on the principle of a lever, the rotational force that opens the door 23 acts as a force to lift the front end of the main body of the printer 20 upward. In order to lift the printer 20, a force greater than the weight of the printer 20 must be applied, but in a state where the printer 20 is inserted into the mounting space S, it is difficult to apply force directly to the printer 20 due to space constraints. However, the present invention uses the rotation of the door 23 to easily lift the printer 20 with much less force, and there is an effect in that the stress of the door 23 is concentrated as it is in line contact with the support surface, thereby maintaining the fulcrum stable without slipping.

Referring to FIG. 7, when the door 23 makes surface contact with a portion of the bottom surface 110, the position of the front end of the main body of the printer 20, which is rising, becomes the highest height. When the door 23 makes surface contact with a portion of the bottom surface 110, the door 23 is fully opened. And at the same time, the force to lift the printer 20 upward becomes maximum so that the position of the front end of the main body of the printer 20 becomes the highest height.

Referring to FIG. 8, the first height H1, which is the height lowered vertically from the rotation axis X of the door 23 to the outer edge of the door 23, is higher than the second height H2, which is the maximum height of engaging member 210. In order for the groove 21 at a lower portion of the printer 20 to be completely separated from the engaging member 210, the height of the front end of the main body of the printer 20 that is rising to its maximum when the door 23 rotates must be at least higher than the second height H2. The height at which the front end of the main body of the printer 20 rises varies depending on the degree to which the door 23 is opened. Specifically, it varies depending on the vertical height from the rotation axis X of the door 23 to the outer edge of the door 23. The maximum height at which the front end of the main body of the printer 20 rises is a state where the door 23 is in surface contact with the support area 111 of the bottom surface 110. Therefore, if the second height H2 in this state is higher than the first height H1, the engagement is released as the groove 21 is completely separated from the engaging member 210.

In a printer detachable kiosk apparatus 10 according to an embodiment of the present invention, when the printer 20 is inserted into the mounting space S of the housing unit 100, the lower portion of the printer 20 rises along the first plane 211, which is inclined, of the engaging member 210, and at this time, the first plane 211 and the second plane 213 may be elastically deformed and their slope may be temporarily changed. The printer 20, which ascends the first plane 211, is stably mounted in the mounting space S of the housing unit 100 as the second plane 213 is engaged with an inner side surface of the groove 21. And when the door 23 of the printer is opened, the front end of the main body of the printer 20 begins to rise as the door 23 comes 20 into line contact with the support area 111 of the bottom surface 110, and as surface contact occurs, the front end of the main body of the printer 20 rises to its maximum. When the front end of the main body of the printer 20 rises to its maximum, the lower portion of the printer 20 rises to at least the second height H2 and is higher than the height of the second plane 213, and the groove 21 separates from the engaging member 210. When the printer 20 or the door 23 is pulled in a state where the coupling with the stand unit 200 is released, the printer 20 is easily detached from the kiosk apparatus 10. In addition, the fastening hole can be separated from the stand unit 200 exposed through the cut area of the base unit 300 to release the coupling. When the stand unit 200 is separated from the housing unit 100, the configuration for fixing the printer 20 within the mounting space S disappears, so the printer 20 can be detached from the kiosk apparatus 10. Meanwhile, in order to prevent theft of the printer 20, when the fastening hole is coupled to the printer fastening hole 25 through the base fastening hole 310 and the housing fastening hole 115, the printer 20 is firmly fixed to the housing unit 100. Therefore, in order to detach and mount the printer 20, the fastening hole must first be removed. When removing the fastening hole being exposed through the base fastening hole 310, the fixing of the printer 20 and housing unit 100 is released, thereby detaching and mounting of the printer 20 from and onto the kiosk apparatus 10 becomes possible by rotating the door 23 of the printer 20.

So far, the present invention has been reviewed with a focus on preferred embodiments. A person skilled in the art to which the present invention belongs will understand that the present invention may be implemented in a modified form without departing from the essential characteristics of the present invention. Therefore, the disclosed embodiments should be considered from an illustrative rather than a restrictive perspective. The scope of the present invention is indicated in the claims rather than the foregoing description, and all differences within the equivalent scope should be construed as being included in the present invention.

DESCRIPTION OF THE SYMBOLS

10: kiosk apparatus
20: printer
21: groove
23: door
25: printer fastening hole
100: housing unit
110: bottom surface
111: support area
113: penetrating surface
115: housing fastening hole
120: pad
200: stand unit
210: engaging member
211: first plane
213: second plane
220: fixing member
221: coupling hole
300: base unit
310: base fastening hole
H1: first height
H2: second height
S: mounting space
X: rotation axis

The invention claimed is:

1. A kiosk apparatus configured to be coupled to a printer having a groove defined at a lower portion of the printer, the kiosk apparatus comprising:

a housing unit having a mounting space configured to receive and mount the printer therein; and a stand unit including:

an engaging member protruding upward beyond a bottom surface of the housing unit and configured to be received in the groove; and a fixing member being connected to the engaging member and coupled to the bottom surface, wherein in a state in which a door of the printer is opened, a portion of the bottom surface positioned adjacent to a front end of the engaging member is configured to support one edge of the door to raise and tilt a front end of a main body of the printer such that the groove is separated from the engaging member, wherein when the one edge of the door comes into line contact with the portion of the bottom surface positioned adjacent to the front end of the engaging member, the portion of the bottom surface is configured to act as a fulcrum to raise the front end of the main body of the printer while the door is in line contact with the portion of the bottom surface.

2. The kiosk apparatus according to claim 1, wherein the engaging member includes a first plane and a second plane each having a slope that is constant, and wherein the first plane and the second plane are bent from and connected to each other such that the slope of the first plane is different from the slope of the second plane and a height difference is defined between a point on the first plane and a point on the second plane that are spaced apart from each other.

3. The kiosk apparatus according to claim 1, wherein when the door comes into surface contact with the portion of the bottom surface, the front end of the main body of the printer is configured to rise to a highest height.

4. The kiosk apparatus according to claim 3, wherein in a state in which the door is in surface contact with the portion of the bottom surface, a first height, which is a height extending vertically from a rotation axis of the door to an outer edge of the door, is higher than a second height, which is a maximum height of the engaging member.

5. The kiosk apparatus according to claim 1, wherein the engaging member is inserted into a penetrated surface defined in another portion of the bottom surface while the fixing member is coupled to a lower surface of a bottom wall of the housing unit, the bottom wall including the lower surface and the bottom surface, the lower surface and the bottom surface facing in opposite directions to each other.

6. The kiosk apparatus according to claim 5, further comprising:

a base unit that is surface-coupled to the lower surface of the bottom wall and having a penetrated portion at a position corresponding to the lower surface coupled with the fixing member and the penetrated surface.

7. The kiosk apparatus according to claim 6, wherein in a state in which the engaging member is engaged in the groove, a printer fastening hole defined at a lower portion of the printer, a housing fastening hole defined at the bottom surface of the housing unit, and a base fastening hole defined at the base unit are positioned to correspond to one another, and a fastener is coupled to the printer fastening hole through the base fastening hole and the housing fastening hole.

* * * * *